(12) United States Patent
King

(10) Patent No.: US 7,852,755 B2
(45) Date of Patent: Dec. 14, 2010

(54) DEVICE AND METHOD FOR MAINTAINING A TELEPHONE CALL DURING POWER FAILURES IN AN IP NETWORK

(75) Inventor: Neal King, München (DE)

(73) Assignee: Lantiq Deutschland GmbH, Neubiberg (DE)

( * ) Notice: Subject to any disclaimer, the term of this patent is extended or adjusted under 35 U.S.C. 154(b) by 784 days.

(21) Appl. No.: 11/415,400

(22) Filed: Apr. 28, 2006

(65) Prior Publication Data

US 2007/0036148 A1  Feb. 15, 2007

(30) Foreign Application Priority Data

Apr. 29, 2005  (DE)  ........................ 10 2005 020 042

(51) Int. Cl.
*G01R 31/08*   (2006.01)
*H04J 1/16*    (2006.01)
*H04L 12/16*   (2006.01)
*H04M 3/42*    (2006.01)
*H04M 7/00*    (2006.01)

(52) U.S. Cl. .................. 370/228; 370/259; 379/212.01; 379/221.04

(58) Field of Classification Search ................. 370/228, 370/259, 271, 283; 379/212.01, 221.01, 379/221.02, 221.03, 221.04
See application file for complete search history.

(56) References Cited

U.S. PATENT DOCUMENTS

| | | | |
|---|---|---|---|
| 5,566,236 A * | 10/1996 | MeLampy et al. ..... | 379/210.01 |
| 5,912,963 A | 6/1999 | Begeja et al. | |
| 6,064,727 A * | 5/2000 | Levy ...................... | 379/221.01 |
| 6,272,209 B1 * | 8/2001 | Bridger et al. ........... | 379/27.01 |
| 6,347,075 B1 * | 2/2002 | Barzegar et al. ............ | 370/228 |
| 6,363,065 B1 * | 3/2002 | Thornton et al. ............ | 370/352 |
| 6,389,005 B1 * | 5/2002 | Cruickshank ............... | 370/352 |
| 6,647,117 B1 * | 11/2003 | Wallace et al. .............. | 379/413 |
| 7,050,546 B1 * | 5/2006 | Richardson et al. ........ | 379/9.05 |
| 7,382,767 B2 * | 6/2008 | Stumer ........................ | 370/352 |
| 2002/0101818 A1 | 8/2002 | Teixeira | |
| 2003/0194077 A1 * | 10/2003 | Ramey .................. | 379/221.01 |

FOREIGN PATENT DOCUMENTS

DE  38 05 632 C1  6/1989

(Continued)

OTHER PUBLICATIONS

"Call Transfer Supplementary Service for H.323." *ITU-T Recommendation H.450.2*. Sep. 24, 1997. (47 Pages).

(Continued)

*Primary Examiner*—Alpus H Hsu
*Assistant Examiner*—Jeremy Costin
(74) *Attorney, Agent, or Firm*—Eschweiler & Associates, LLC

(57) ABSTRACT

A communication device comprises a first transmitter configured to transmit a telephone signal via a broadband-communication link to an IP network, and a second transmitter configured to transmit a telephone signal via an alternative communication link to a telephone network. The telephone signal is transferred from a first telephone number for identifying the communication device in the transmission of the telephone signal via the broadband-communication link to a second telephone number associated with the alternative communication link when a power failure occurs during a transmission of the telephone signal via the broadband-communication link.

20 Claims, 8 Drawing Sheets

FOREIGN PATENT DOCUMENTS

| | | |
|---|---|---|
| EP | 1 229 745 A2 | 8/2002 |
| JP | 200586286 * | 3/2005 |
| WO | WO 01/13618 A1 | 2/2001 |
| WO | WO 01/13622 A2 | 2/2001 |
| WO | WO0126313 * | 4/2001 |

OTHER PUBLICATIONS

Handley et al. "SIP: Session Initiation Protocol." *IETF RFC 2543.* Mar. 1999. http://tools.ietf.org/html/rfc2543 (8 pages).

* cited by examiner

DEVICE AND METHOD FOR MAINTAINING A TELEPHONE CALL DURING POWER FAILURES IN AN IP NETWORK

FIELD

The present invention relates to a communication device and a method of operating a communication device, the communication device being configured for transmitting a telephone signal via a broadband-communication link, e.g. using a Voice-over-IP (VoIP) transmission method and a Digital-Subscriber-Line (DSL) connection or a cable-modem connection.

BACKGROUND

Using for example the VoIP transmission method, it has become possible to provide for the transmission of a telephone signal, which is conventionally transmitted over an analog signal connection to a telephone network, e.g. a public-switched telephone network, via a broadband-communication link to a so-called IP network (Internet Protocol network). In this case, the connection from a communication device which is located at a subscriber site to the IP network typically involves a connection from the subscriber site to a central office according to a DSL transmission method or a cable-modem connection from the subscriber site to an access point of the IP network. In the central office usually a high-speed connection to the IP network is provided.

For providing a telephone service via the broadband-communication link, a service provider provides a telephone number which is assigned to the communication device located at the subscriber site. The VoIP transmission, i.e. the telephone signal, is received in the IP network and forwarded to another communication device and vice versa. The other communication device may be either directly connected to the IP network via a broadband-communication link as described above or may be connected to a conventional telephone network via an analog signal connection. In the latter case, the transmission of the telephone signal from the IP network to the telephone network is accomplished via a so-called VoIP gateway connecting the IP network and the telephone network.

Conventional telephone devices which are connected to the central office via an analog signal connection typically receive electrical power from the central office via the same physical line which carries the analog signal connection. Therefore, a conventional telephone device is usually also operable in case of a power failure at the subscriber site. However, communication devices for transmitting the telephone signal via a broadband-communication link are usually supplied with electrical power using a local power source at the subscriber site. Therefore, these communication devices are usually not operable in case of a power failure at the subscriber site or are only operable for a limited period of time by using a back-up power source, e.g. an emergency battery. Moreover, the transmission of the telephone signal using the broadband-communication link requires a large amount of electrical power as compared to the transmission of the telephone signal using an analog signal connection. Consequently, the back-up power source will soon be exhausted.

Therefore, in order to provide a telephone service also in the event of a power failure a communication device can be reconfigured in such a manner that an alternative communication link, e.g. an analog signal connection to a telephone network, is provided in case of a power failure at the subscriber site. This allows for maintaining the telephone service without excessive requirements of electrical power.

In the above approach of reconfiguring a communication device in case of a power failure there exist, however, problems in that an ongoing transmission of the telephone signal, i.e. an ongoing call, will be dropped or interrupted if the power failure occurs during the transmission of the telephone signal via the broadband-communication link. This dropping of an ongoing call is not desirable for a user of the communication device and, moreover, is considered to be unacceptable by some service providers, because the ongoing transmission of the telephone signal may constitute an emergency call.

Interrupting the transmission or dropping the call could be prevented by maintaining the transmission on the broadband-communication link for as long as the call continues. But this has the disadvantage of using a lot of electrical power, so that the back-up power source will be exhausted by keeping components for maintaining the broadband-communication link active, as these components typically require a large amount of electrical power.

SUMMARY

The present invention provides a method of operating a communication device and a communication device.

In general terms, the method and the communication device disclosed herein provide that the transmission of a telephone signal is transferred from a first telephone number for identifying the communication device in the transmission of the telephone signal via the broadband-communication link to a second telephone number associated with an alternative communication link when a power failure occurs during an ongoing transmission of the telephone signal via the broadband-communication link.

DETAILED DESCRIPTION

Figure 1:
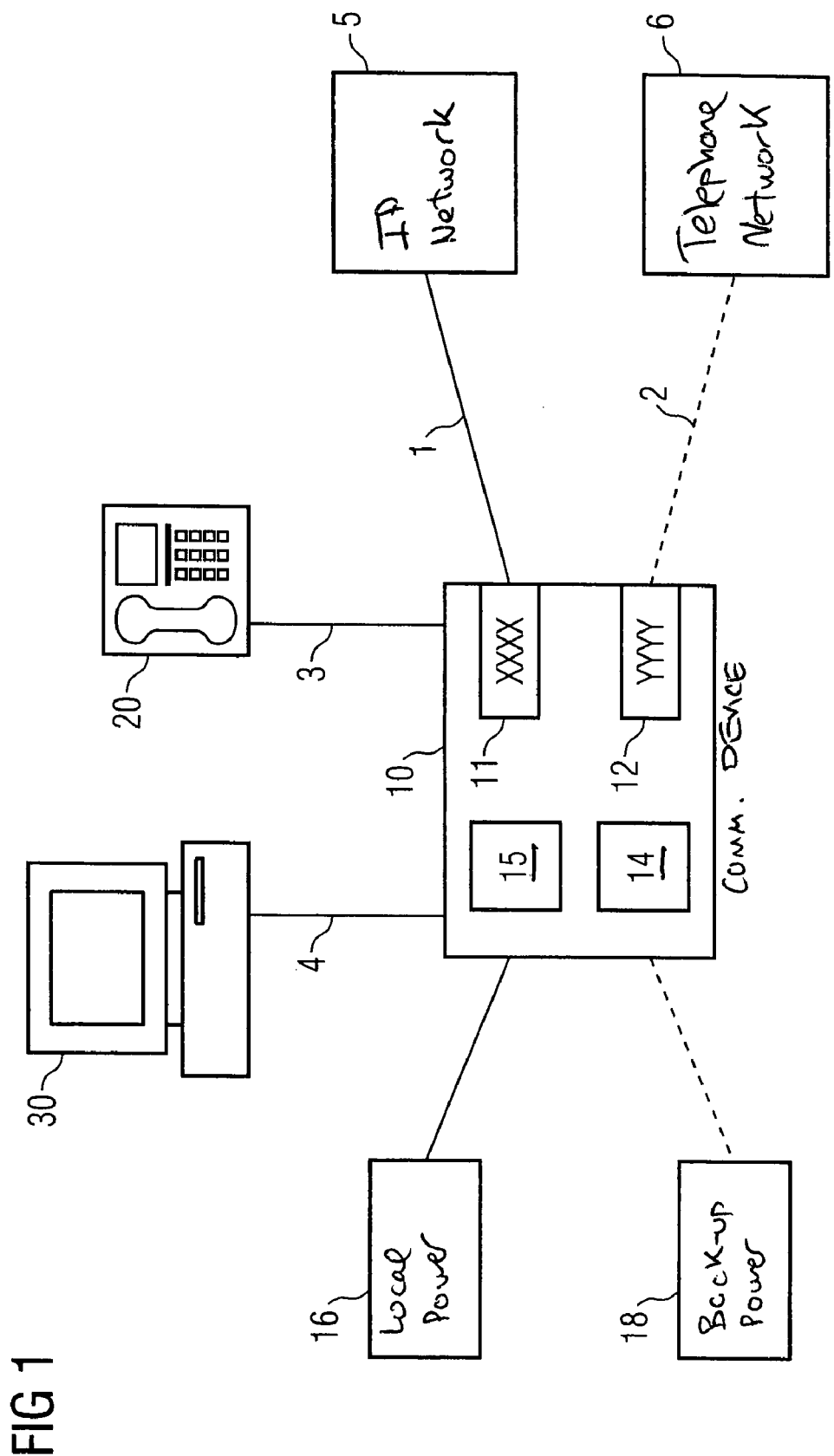
FIG. 1 is a schematic illustration of a communication device according to an embodiment of the present invention including peripheral connections to external units, the illustration relating to a normal operating mode of the communication device.

In the following, preferred embodiments of the present invention will be described by reference to the accompanying drawings.

According to an embodiment of the present invention, a method of operating a communication device involves that, in normal operation, a broadband-communication link is provided for transmitting a telephone signal. In case of a power failure, an alternative communication link is provided for transmitting the telephone signal. A first telephone number is assigned to the communication device for identifying the communication device in the transmission of the telephone signal via the broadband-communication link. In case of the telephone signal being transmitted via the broadband-communication link when the power failure occurs, the transmission of the telephone signal is transferred from the first telephone number to a second telephone number associated with the alternative communication link. According to a further embodiment, also the second telephone number is assigned to the communication device for identifying the communication device in the transmission of the telephone signal over the alternative communication link.

The broadband-communication link may in particular be configured according to a DSL transmission method or as a cable-modem connection and may provide connection to an IP network for transmitting the telephone signal using a VoIP transmission method. The alternative communication link may be an analog signal connection to a telephone network, thereby providing a minimum requirement of electrical power in case of the power failure.

As mentioned above, also the second telephone number may be assigned to the communication device, so that it is possible to receive the transferred transmission of the telephone signal using the same physical device. Alternatively, the second telephone number may be assigned to an alternative communication device connected to the alternative communication link, e.g. an analog telephone device for emergency purposes. The latter alternative may in particular be selected in case of the broadband-communication link being configured as a cable-modem connection and the alternative communication link being configured as an analog signal connection to the telephone network, as the need to additionally connect the communication device to the telephone network via the analog signal connection can be avoided.

The method according to embodiments as described above enables the communication device, in normal operation, to transmit the telephone signal via the broadband-communication link using the first telephone number to identify the communication device with respect to the IP network. The second telephone number is used to identify the communication device or the alternative communication device with respect to the alternative communication link for emergency purposes. By this means, the present invention allows for an ongoing transmission of the telephone signal being continued in case of the power failure, instead of being dropped, by transferring the transmission from the first telephone number to the second telephone number. As soon as the transmission has been transferred, the communication device can begin saving power by turning off the broadband-communication link. Irrespective of how long the transmission of the telephone signal continues, the power consumption of the communication device will be minimal, because only the power needed for the alternative communication link is used. Moreover, in case of the alternative communication link being an analog signal connection to a telephone network, electrical power for the operation of the communication device or of the alternative communication device can be taken from the physical line carrying the alternative communication link.

According to an embodiment of the present invention, it is preferred that a back-up power source is used for maintaining the broadband-communication link until the transmission of the telephone signal has been transferred from the first telephone number to the second telephone number. In this case, the broadband-communication link is maintained only as long as necessary and excessive use of the back-up power source is avoided.

The process of transferring the transmission of the telephone signal from the first telephone number to the second telephone number preferably comprises sending a call-transfer command from the communication device to a service provider of the first telephone number and receiving the transferred transmission on the second telephone number. The possibility of making a call transfer is usually supported by the VoIP telephone services and can be initiated by sending the call-transfer command. Upon receiving the call-transfer command, the service provider re-routes the transmission of the telephone signal established between two end points by replacing one of the end points. In the present case, the end point to be replaced and the end point by which it is replaced are at the same location, or even formed by the same communication device, but identified by different telephone numbers. The use of existing call-transfer commands for implementing the present invention has the advantage of requiring no change to the network infrastructure.

Preferably, a user of the communication device is warned, e.g. by an acoustical warning signal, that the transmission will be transferred. By this means, the user can make a decision whether it is necessary to maintain the ongoing transmission of the telephone signal or to interrupt the transmission in order to save power. Further, the user will be aware of eventual delays or other disturbances in the transmission of the telephone signal.

In addition, it is preferred that the communication device is switched into a low-power mode after the transmission of the telephone signal has been transferred from the first telephone number to the second telephone number. This low-power mode may in particular involve turning off communication links to peripheral devices which are not necessary for the transmission of the telephone signal. In the low-power mode, the broadband-communication link is not active. If the transmission is transferred to the alternative communication device, it may even be possible to entirely switch off the communication device.

In a further embodiment, the present invention relates to a communication device for transmitting a telephone signal via a broadband-communication link. The communication device is configured in such a manner that a first telephone number can be assigned to the communication device for identifying the communication device in the transmission of the telephone signal via the broadband-communication link. In order to avoid an ongoing transmission of the telephone signal being dropped when a power failure occurs, the communication device is configured to transfer the transmission of the telephone signal from the first telephone number to a second telephone number associated with an alternative communication link for transmitting the telephone signal in the event of a power failure, in case of the telephone signal being transmitted via the broadband-communication link when the power failure occurs.

The communication device may additionally be configured in such a manner that also the second telephone number can be assigned to the communication device for identifying the communication device in the transmission of the telephone signal via the alternative communication link. In this case the communication device itself provides the alternative communication link for transmitting the telephone signal in case of a power failure.

In addition, the communication device preferably comprises means for detecting the power failure, so that the transfer of the transmission of the telephone signal from the first telephone number to the second telephone number may be initiated sufficiently early.

Further, it is preferred that the communication device comprises a back-up power source for maintaining the operation of the communication device when the power failure occurs. Alternatively, the back-up power source may be provided externally, i.e. as a separate component.

Moreover, it is preferable that the communication device is configured to provide the broadband-communication link and the alternative communication link on the same physical line, e.g. by using different frequency ranges. By this means, the structure of the communication device is simplified and no additional infrastructure is required for providing both the broadband-communication link and the alternative communication link.

The communication device may be configured as an integrated access device which, in addition to the transmission of the telephone signal, provides for the transmission of a data signal, e.g. from a computer system connected to the communication device.

The communication device according to the embodiment of the present invention is preferably configured to implement the method according to embodiments of the present invention as described above.

According to a further embodiment, the present invention may also be implemented by using a computer-executable program code in a computer-controlled communication device, the program code being configured in such a manner that it causes the computer-controlled communication device to operate according to the method as described above. Accordingly, the present invention also relates to a computer program product comprising the computer-executable program code, e.g. on a suitable data storage medium. In this way, existing communication devices can be retrofitted to operate according to the method of the invention as described above.

FIG. 1 schematically illustrates the structure of a communication device 10 for transmitting a telephone signal 3 from a telephone device 20 via a broadband-communication link 1. The communication device 10 is configured as an integrated access device which provides for transmitting both the telephone signal 3 and a data signal 4 from a computer system 30 via the broadband-communication link 1. The telephone signal 3 is supplied to the communication device 10 from the telephone device 20. Of course, it is also possible that the telephone device 20 and the communication device 10 are integrated into a single device. Further, it is also possible to implement the communication device 10 within the computer system 30, in which case the telephone device 20 could be implemented by means of a suitable input/output device for acoustic signals. For the purpose of better illustrating the present invention, the communication device 10, the telephone device 20 and the computer system 30 will in the following be described as separate devices.

The communication device 10 is connected to an IP network 5 via the broadband-communication link 1. The broadband-communication link 1 is preferably configured according to a DSL transmission method which provides for the transmission of broadband communication signals via a two-wire line connecting a subscriber site to a central office. The actual connection to the IP network 5 is then established via a high-speed connection in the central office.

It is also possible that the two-wire line is connected to a so-called optical network unit (ONU), which is a device providing two-wire interfaces to the local neighborhood, i.e. to the subscriber sites, and a fiber-optical interface to the central office or to an access point to the IP network.

In addition, the communication device 10 is configured to provide an alternative communication link 2 to a telephone network 6. The alternative communication link 2 consists of an analog signal connection as typically used in conventional telephone systems. Although the broadband-communication link 1 and the alternative communication link 2 are illustrated as separate connections, they may actually be implemented using the same physical line, e.g. by using different frequency ranges. Typically, a high-frequency range is used for transmitting a broadband communication signal according to a DSL transmission method, and a low-frequency range is used for transmitting an analog signal.

The communication device 10 is supplied with electrical power from a local power source 16 located at the subscriber site. In addition, a back-up power source 18 is provided for supplying power to the communication device 10 in case of a failure of the local power source 16. Alternatively or in addition, the communication device 10 may also receive electrical power from the line connecting the communication device 10 to the telephone network 6, i.e. from the line carrying the alternative communication link. The back-up power source 18 may for example include an emergency battery.

The communication device 10 comprises a controller 14 for controlling the operation of the communication device 10. The controller 14 is preferably implemented by means of a suitable micro-computer operating according to an operating program stored in a memory of the communication device 10. Therefore, the communication device 10 can be configured to operate according to a particular method by storing a suitably designed program code in the memory of the communication device 10.

Further, the communication device 10 comprises power-failure detecting means 15 for detecting a failure of the local power source 16. The power-failure detecting means 15 may for example comprise a voltage measuring device, and supply a control signal to the controller 14, the control signal indicating whether the voltage supplied by the local power source 16 is inside or outside a predetermined range.

As illustrated, the communication device 10 has a first input 11 for connecting the communication device 10 to the IP network 5 via the broadband-communication link 1. A first telephone number XXXX is assigned to the first input 11 for identifying the communication device 10 with respect to the IP network 5 when establishing the transmission of the telephone signal 3 via the broadband-communication link 1. A second telephone number YYYY is assigned to a second input 12 of the communication device 10 for identifying the communication device 10 with respect to the telephone network 6 when a transmission of the telephone signal 3 is established via the alternative communication link 2. In case that the broadband-communication link 1 and the alternative communication link 2 are carried by the same physical line, the first input 11 and the second input 12 are implemented as a single physical interface comprising the functions of two different inputs. The communication device 10 is therefore configured in such a manner that it can be operated using two different telephone numbers related to different communication links.

Although not illustrated in FIG. 1, connections can be established between the IP network 5 and the telephone network 6 by means of a VoIP gateway.

The first telephone number XXXX assigned to the first input 11 of the communication device 10 is provided by a service provider of VoIP-communication in the IP network 5, and the second telephone number YYYY assigned to the second input 12 of the communication device 10 is provided by a service provider of the telephone network 6. Of course, the service provider of the VoIP communication in the IP network 5 and the service provider of the telephone network 6 may be identical.

FIG. 1 illustrates a normal operating mode of the communication device 10. In the normal operating mode, electrical power is supplied to the communication device 10 from the local power source 16. The back-up power source 18 is inactive, as illustrated by the dashed line connecting the back-up power source 18 and the communication device 10.

In the normal operating mode, the telephone signal 3 from the telephone device 20 is transmitted to the IP network 5 via the broadband-communication link 1. For establishing the transmission of the telephone signal 3, the communication device 10 is identified by means of the first telephone number XXXX. In addition, a data signal 4 from the computer system 30 is transmitted between the IP network 5 and the communication device 10 via the broadband-communication link 1. The alternative communication link 2 connecting the communication device 10 to the telephone network 6 is inactive in the normal operating mode, as illustrated by the dashed line connecting the communication device 10 and the telephone network 6.

Figure 2:
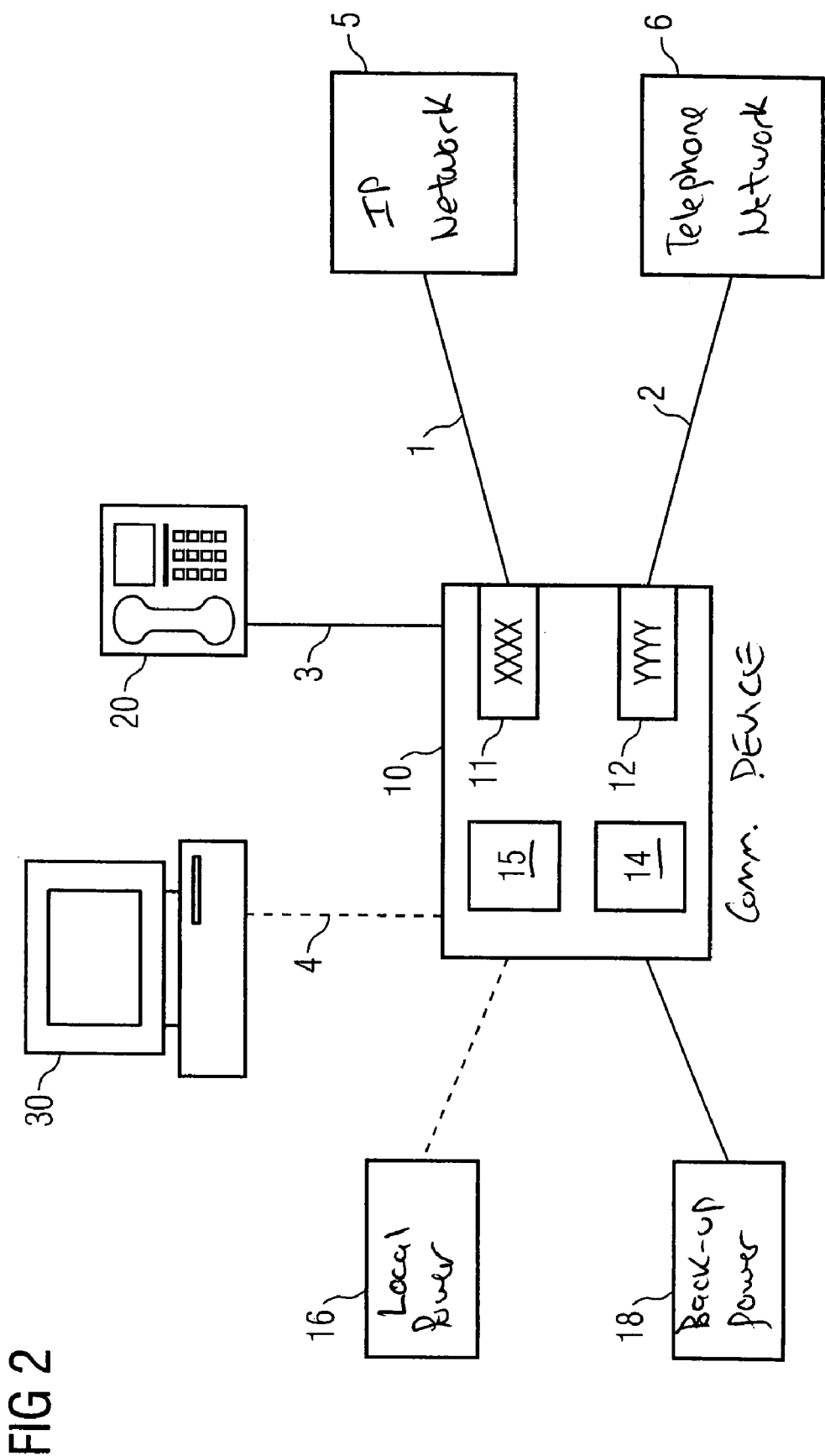
FIG. 2 is a schematic illustration of the communication device as shown in FIG. 1, the illustration relating to a transitional configuration of the communication device when going from the normal operating mode to an emergency configuration in the event of a power failure.

FIG. 2 illustrates a transitional configuration of the communication device 10 immediately after a power failure of the local power source 16 has occurred. The failure of the local power source 16 is indicated by the dashed line connecting the local power source 16 and the communication device 10. The failure of the local power source 16 is detected by the power-failure detecting means 15. Upon detecting the failure of the local power source 16, the data communication between the computer system 30 and the communication device 10 is turned off so as to save the electrical power required for maintaining the communication with the computer system 30 and for transmitting the data signal 4 via the broadband-communication link 1. This is illustrated by the dashed line connecting the computer system 30 and the communication device 10. Further, the alternative communication link 2 is activated, as illustrated by the solid line connecting the communication device 10 and the telephone network 6.

In this situation, if there is an ongoing transmission of the telephone signal 3 via the broadband-communication link 1, i.e. an ongoing call on the telephone device 20, a transfer of the transmission of the telephone signal 3 from the first telephone number XXXX to the second telephone number YYYY is initiated. This is accomplished by sending a call-transfer command via the broadband-communication link 1 to the service provider of VoIP communication in the IP network 5. A call-transfer command is defined both in the so-called Session Initiation Protocol (SIP, IETF RFC 2543) and in ITU-T Recommendation H.450.2, "Call Transfer Supplementary Service for H.323".

Before sending the call-transfer command, the user of the telephone device 20 is warned by means of an acoustic warning signal and has the possibility to take appropriate measures, i.e. interrupt the call or take into account eventual delays or other disturbances occurring in the transmission of the telephone signal 3.

After sending the call-transfer command, a transmission of the telephone signal 3 is established via the alternative communication link 2 by receiving the transmission of the telephone signal 3 on the second telephone number YYYY, thereby concluding the process of transferring the transmission of the telephone signal 3 from the first telephone number XXXX to the second telephone number YYYY. The communication device 10 is then switched into a low-power mode corresponding to an emergency configuration.

Figure 3:
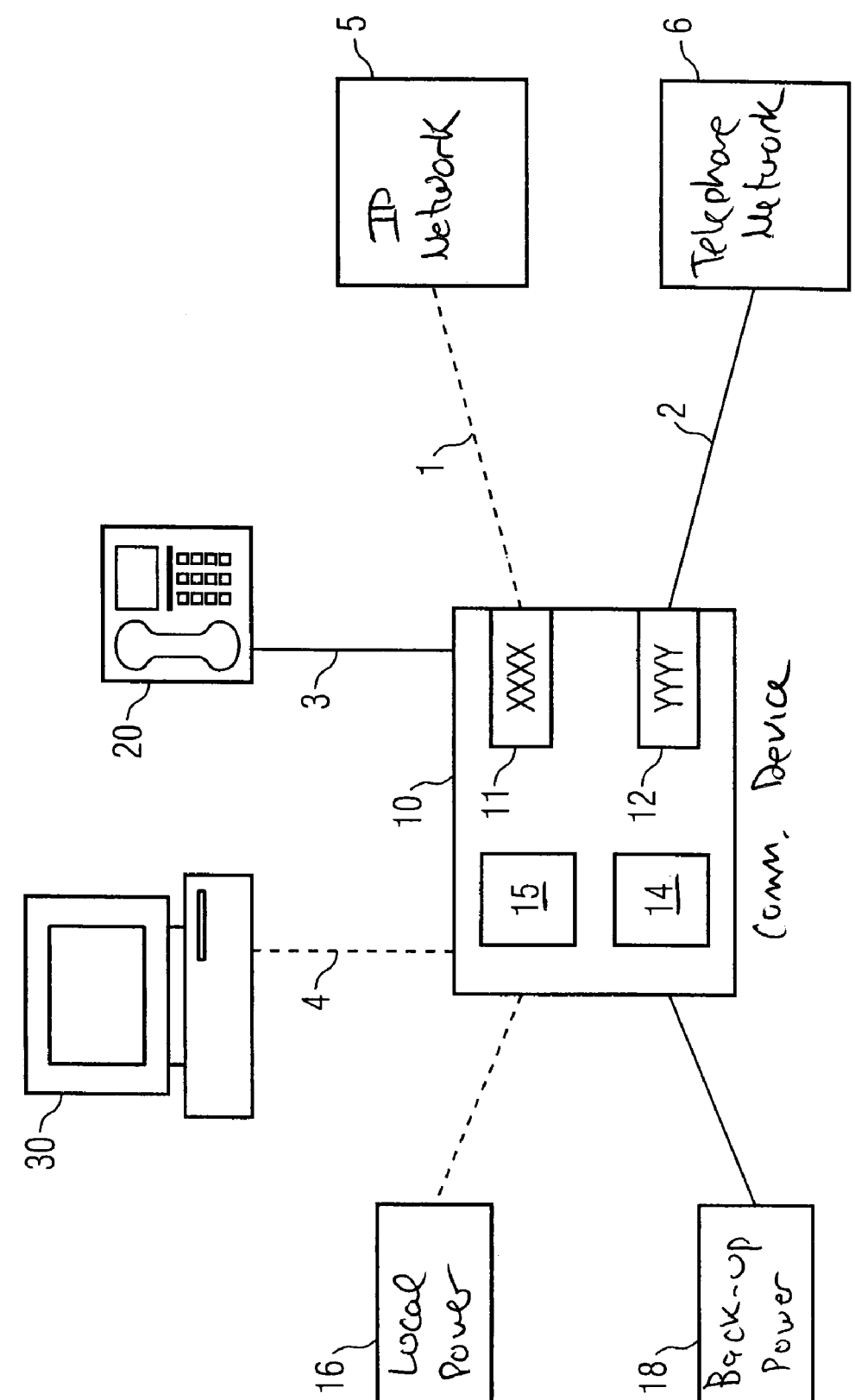
FIG. 3 is a schematic illustration of the communication device as shown in FIGS. 1 and 2, the illustration relating to the emergency configuration of the communication device.

The emergency configuration is illustrated in FIG. 3. In the emergency configuration, the broadband-communication link 1 is not active, as illustrated by the dashed line connecting the communication device 10 and the IP network 5. Further, other peripheral connections which are not necessary for transmitting the telephone signal 3, such as the connection to the computer system 30 for transmitting the data signal 4 are turned off. By this means, a minimal power consumption of the communication device 10 is achieved. In the emergency configuration, the communication device 10 receives power from the back-up power source 18 which, for example, includes an emergency battery. By minimizing the power consumption of the communication device 10, the available time in which the communication device 10 can be operated and the transmission of the telephone signal 3 can be maintained is maximized.

Although the back-up power source 18 is illustrated as a separate component in the figures, it may also be integrated into the communication device 10. Further, the communication device 10 may also receive electrical power from the line connecting the communication device 10 to the telephone network 6. In this case, the available period of time for operating the communication device 10 after a power failure can be further extended. By configuring the communication device 10 in such a manner that the electrical power supplied to the communication device 10 from the line connecting the communication device 10 to the telephone network 6 is sufficient to operate the communication device 10 in the emergency configuration, it may even be possible to maintain the operation of the communication device 10 for an unlimited period of time. In this case, it is possible to significantly reduce the capacity of the back-up power source 18 or even to entirely eliminate the back-up power source 18.

Figure 4:
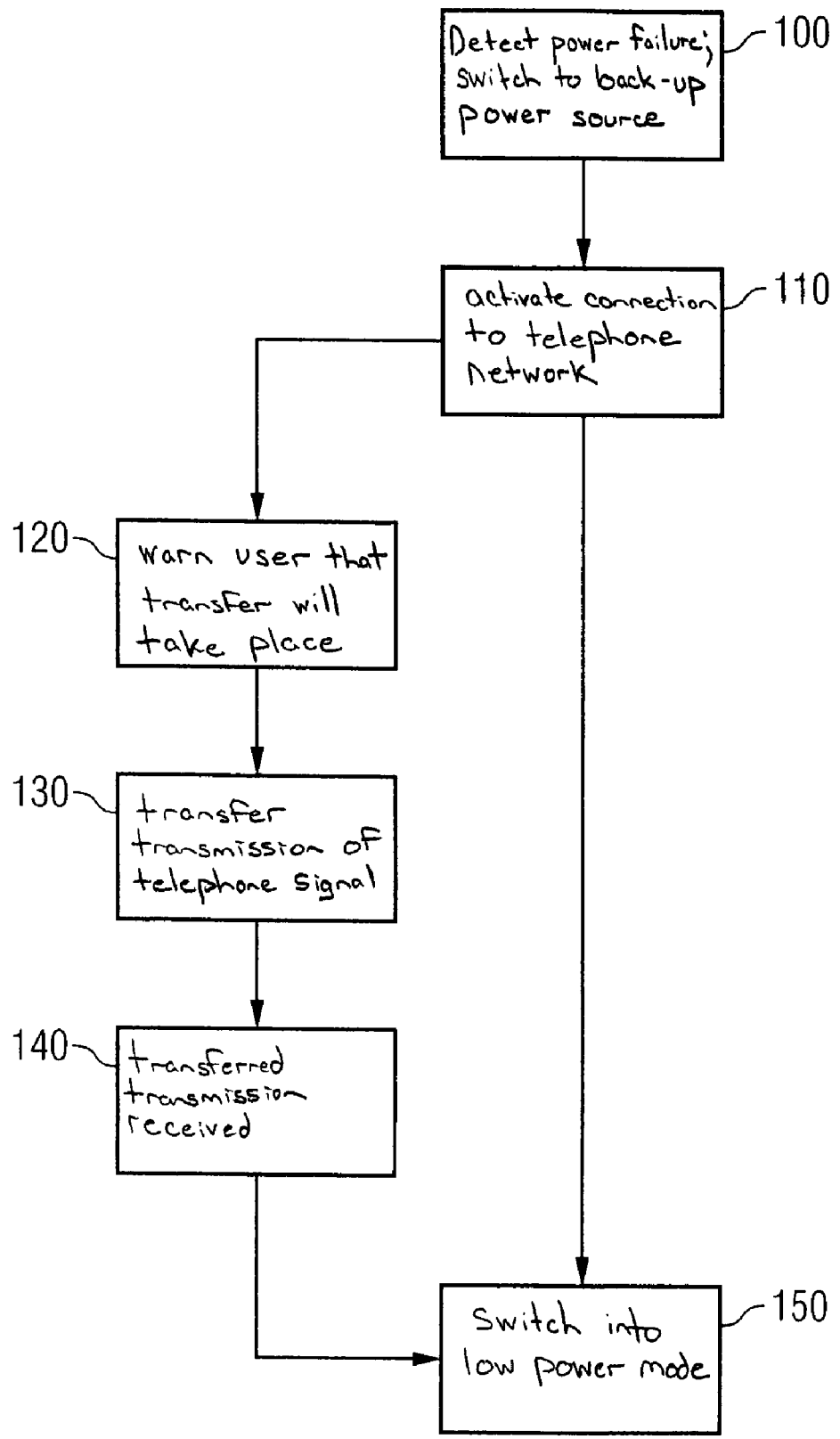
FIG. 4 is a flow-chart illustrating a method according to an embodiment of the present invention.

FIG. 4 is a flow-chart illustrating a method of operating the communication device 10 as illustrated in FIGS. 1-3 in case of a failure of the local power source 16.

In step 100, the power failure is detected and the communication device 10 is switched over to be supplied by the back-up power source 18. Then, in step 110, the alternative communication link 2 is provided by activating the connection to the telephone network 6.

If there is an ongoing transmission of the telephone signal 3 over the broadband-communication link 1, the method continues with step 120. If there is no ongoing transmission of the telephone signal 3, the method continues with step 150.

In case of an ongoing transmission of the telephone signal 3, in step 120, the user of the telephone device 20 is warned that a transfer of the transmission will take place. At this point, the user of the telephone device 20 has the possibility to prevent the transmission from being transferred or to terminate the transmission. Then, in step 130, the transfer of the transmission of the telephone signal 3 from the first telephone number XXXX to the second telephone number YYYY is initiated by sending a call-transfer command to the service provider of VoIP communication in the IP network 5.

In step 140, the transferred transmission of the telephone signal 3 is received in the communication device 10 on the second telephone number YYYY. After step 140, the transfer of the transmission is finished and the method continues with step 150.

In step 150, the communication device 10 is switched into the low-power mode. This in particular includes switching off the broadband-communication link 1 and all peripheral connections which are not necessary for maintaining the transmission of the telephone signal 3 via the alternative communication link 2.

In the low-power mode, which corresponds to the emergency configuration of the communication device 10, an ongoing transmission of the telephone signal 3 may be maintained as long as sufficient power is supplied to the communication device 10 from the back-up power source 18 or from the line connecting the communication device 10 to the telephone network 6. Further, it is possible to establish a new transmission of the telephone signal 3, i.e. to make a new call, or to receive incoming calls via the second telephone number YYYY.

Figure 5:
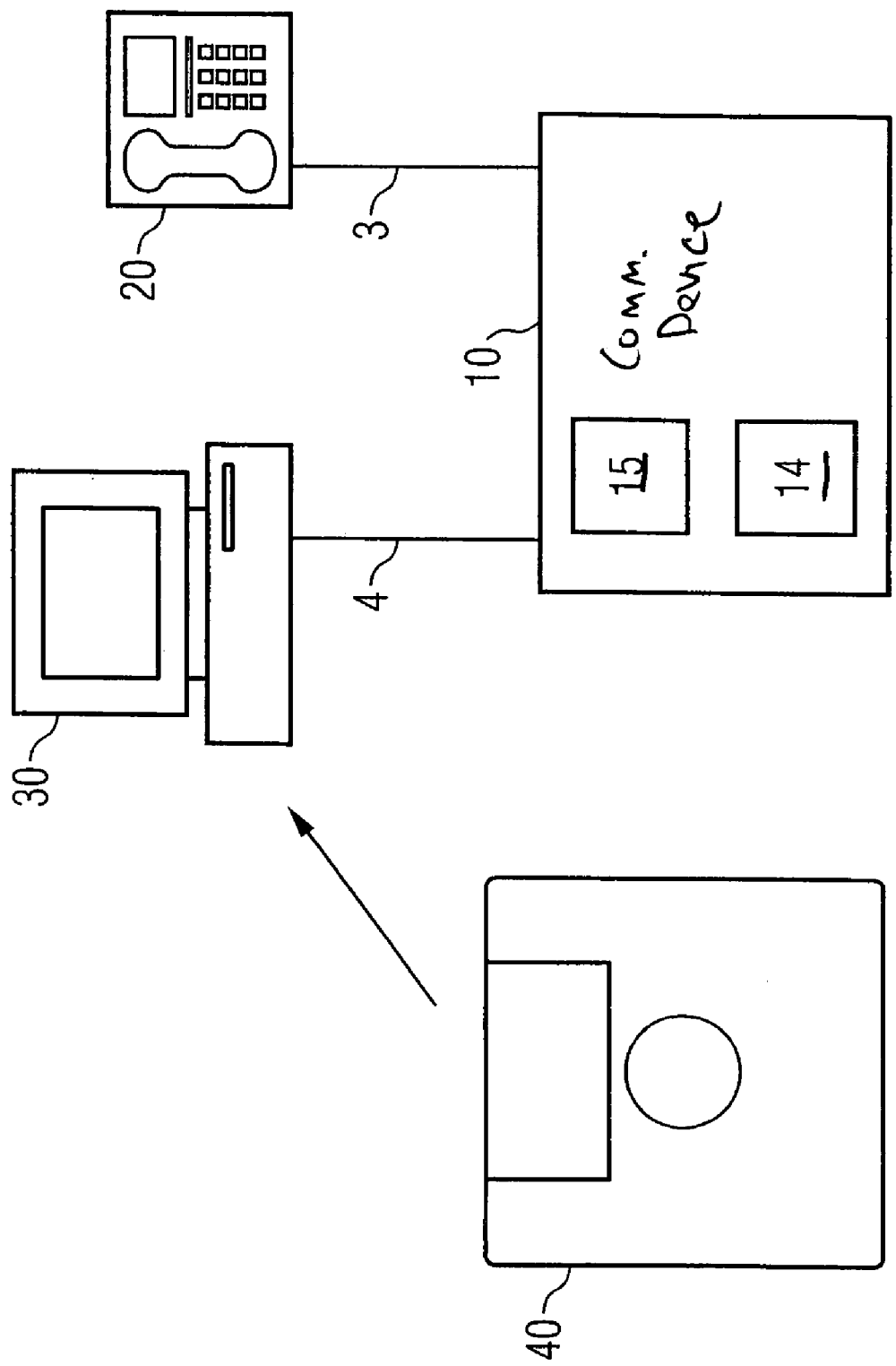
FIG. 5 illustrates an example of configuring the communication device to implement the method according to the present invention by means of a suitably designed computer program product.

FIG. 5 illustrates a procedure of configuring a communication device as illustrated in FIGS. 1-3 to operate according to the above-described method. This is accomplished by means of a suitable computer-executable program code stored on a storage medium 40. The computer-executable program code is transferred to the memory of the communication device 10, thereby causing the communication device 10 to operate according to the above-described method and to automatically execute the above-described method steps.

As illustrated in FIG. 5, the storage medium 40 may be read by the computer system 30 which then transfers the computer-executable program code to the communication device 10 using the data signal 4. Of course, the program code could also be transferred in a different way, e.g. by using a storage medium which is directly readable by the communication device 10 or by using the broadband-communication link 1 for transferring the computer-executable program code to the communication device 10 from the IP network 5. Therefore, it is also possible to retrofit existing communication devices so as to implement the above-described method.

Another approach is that the telephone device 20 is programmed with the capability to transfer the call to the second telephone number upon receiving a corresponding command from the communication device 10.

Although in the foregoing reference was made to a communication device which is connected to the central office using a DSL connection, the broadband-communication link could alternatively be established using a cable-modem connection. As will be appreciated by the skilled person, also other types of broadband connection are possible within the scope of the present invention.

Figure 6:
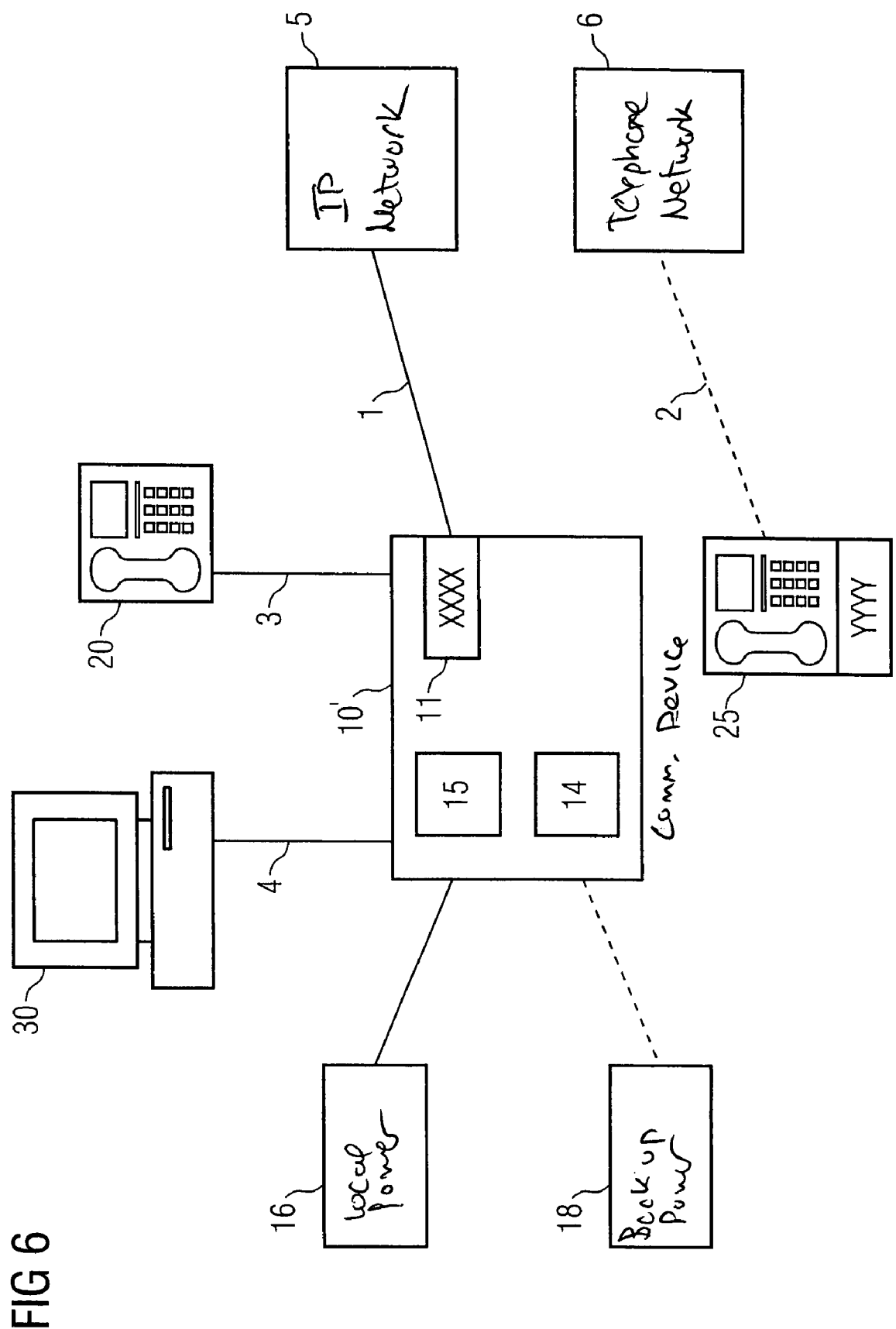
FIG. 6 is a schematic illustration of a communication device according to a further embodiment of the present invention, the illustration relating to a normal operating mode of the communication device.
Figure 7:
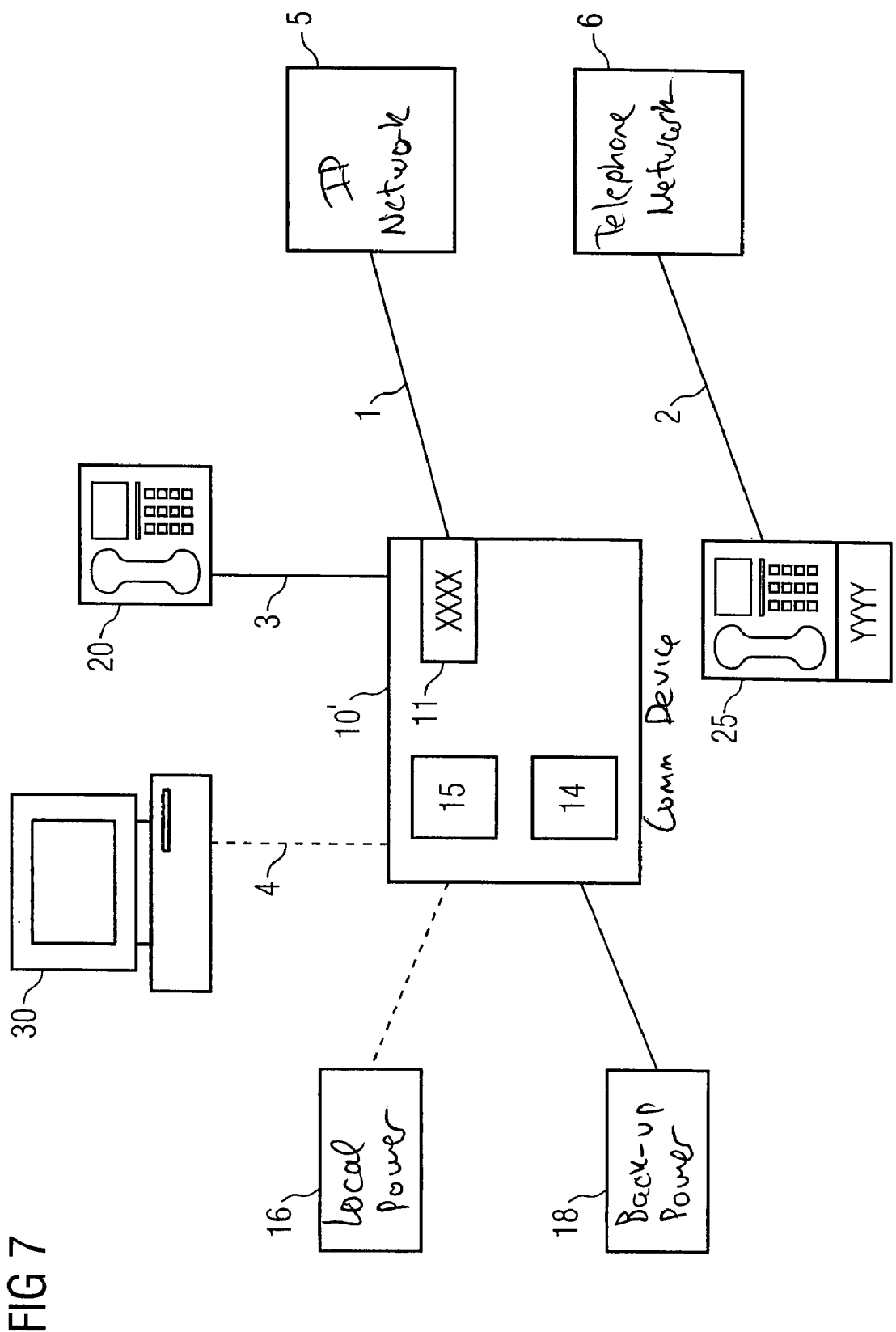
FIG. 7 is a schematic illustration of the communication device as shown in FIG. 6, the illustration relating to a transitional configuration of the communication device when going from the normal operating mode to the emergency configuration in the event of a power failure.
Figure 8:
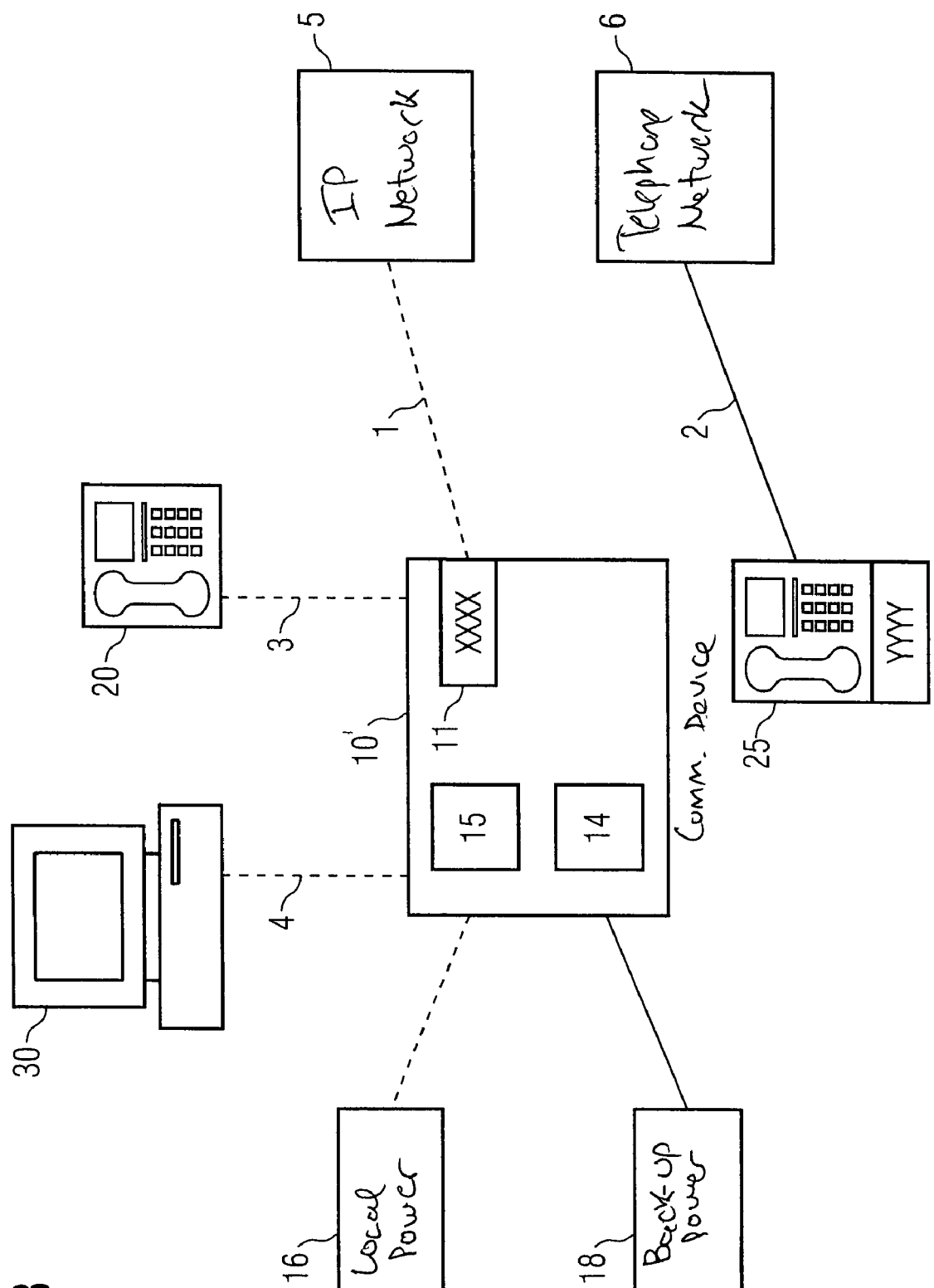
FIG. 8 is a schematic illustration of the communication device as shown in FIGS. 6 and 7, the illustration relating to the emergency configuration of the communication device.

Furthermore, the transferred transmission of the telephone signal could be received in an alternative communication device, e.g. an analog telephone device for emergency purposes, which is located at the same location as the communication device This situation is illustrated in FIGS. 6-8. Generally, the configurations shown in FIGS. 6, 7, and 8 correspond to those shown in FIGS. 1, 2, and 3, respectively, and the operation and configuration of the communication device 10' of FIGS. 6-8 occurs as already described in connection with FIGS. 4 and 5. In FIGS. 6-8 components corresponding to those of FIGS. 1-3 have been designated with the same reference signs and description thereof will be omitted in the following.

In contrast to FIGS. 1-3, in FIGS. 6-8 only the first telephone number XXXX is assigned to the communication device 10'. The second telephone number YYYY is assigned to an analog telephone device 25 connected to the telephone network 6 via the alternative communication link 2. Therefore, when a power failure occurs during an ongoing transmission of the telephone signal 3 via the broadband-communication link 1, the transmission is transferred to the analog telephone device 25. In this arrangement, it is possible to entirely switch off the communication device 10' after the transmission has been transferred to the second telephone number YYYY.

According to a modification of the arrangement shown in FIGS. 6-8, the connection of the analog telephone device 25 to the telephone network 6 can be accomplished via the communication device 10'.

What is claimed is:

1. A method of operating a communication device, the method comprising:
   providing a broadband-communication link coupled to the communication device, the broadband-communication link being configured to transmit a telephone signal, wherein a first telephone number is associated with the broadband-communication link;
   providing an alternative communication link coupled to the communication device, the alternative communication link being configured to transmit the telephone signal, wherein a second telephone number is associated with the alternative communication link;
   transmitting the telephone signal via the broadband-communication link, between a first endpoint associated with the first telephone number and located at of the communication device and a remote second endpoint distant from the first endpoint; and
   in the case of the telephone signal being transmitted via the broadband-communication link when a power failure occurs at the communication device, transferring transmission of the telephone signal from the first telephone number to the second telephone number by sending a call-transfer command from the communication device to a service provider of the first telephone number, the call-transfer command initiating the transfer of an ongoing telephone signal transmission from the broadband-communication link to the alternative communication link by re-routing the transmission of the telephone signal so as to replace the first endpoint with a further endpoint associated with the second telephone number and located at the communication device, and maintaining the ongoing telephone signal transmission at the remote second endpoint; and receiving the transferred transmission on the alternative communication link.

2. The method of claim 1 further comprising, in the event of a power failure, maintaining the broadband-communication link using a back-up power source until the transmission of the telephone signal has been transferred from the broadband-communication link to the alternative communication link.

3. The method of claim 1 wherein the alternative communication link is configured as an analog signal connection to a telephone network.

4. The method of claim 1 wherein the process of transferring the transmission of the telephone signal from the broadband-communication link to the alternative communication link includes sending the call-transfer command and providing a warning that the transmission will be transferred.

5. The method of claim 1 further comprising switching the communication device to a low-power mode after the transmission has been transferred from the broadband-communication link to the alternative communication link.

6. The method of claim 1 further comprising transmitting the telephone signal via the broadband-communication link using a voice-over-IP transmission method.

7. The method of claim 1 wherein the broadband-communication link is configured according to a DSL transmission method.

8. The method of claim 1 wherein the broadband-communication link is configured as a cable-modem connection.

9. A communication device comprising:
   a broadband-communication connection coupled to the communication device, wherein the broadband-communication connection, associated with a first telephone number, is configured to transmit a telephone signal from a first endpoint located at the communication device to a remote second endpoint distant from the first endpoint; and
   a power detector configured to detect a power failure of a local power source;
   the communication device is configured to, transfer transmission of the telephone signal from the first telephone number to a second telephone number, associated with an alternative communication connection, when the power failure occurs at the communication device, by sending a call-transfer command from the communication device to a service provider of the first telephone number, the call-transfer command initiating the transfer of an ongoing telephone signal transmission from the broadband-communication connection to the alternative communication connection by re-routing the transmission of the telephone signal so as to replace the first end-point with a further endpoint associated with the second telephone number located at the communication device, while maintaining the ongoing telephone signal transmission at the remote second endpoint.

10. The communication device of claim 9 wherein the alternative communication connection is configured to transmit the telephone signal and is not a broadband-communication connection.

11. The communication device of claim 9 wherein the communication device is configured to provide the alternative communication connection.

12. The communication device of claim 9 wherein the alternative communication connection is an analog signal connection configured for connection to a telephone network.

13. The communication device of claim 9 further comprising a back-up power source configured to maintain the operation of the communication device when the power failure occurs.

14. The communication device of claim 9 wherein the communication device is configured to receive electrical power from a line connected to the alternative communication connection in case of the power failure.

15. The communication device of claim 9 wherein the broadband-communication connection is configured for connection to the same physical line as the alternative communication connection.

16. The communication device of claim 9 wherein the communication device allows for the additional transmission of a data signal via the broadband-communication connection.

17. A communication device comprising:
   a first transmitter configured to transmit a telephone signal via a broadband communication link;
   a detector configured to detect a power failure;
   a call transfer device configured to initiate a transfer of an ongoing transmission of the telephone signal from a first telephone number associated with the broadband-communication link to a second telephone number associated with an alternative communication link in the event that the telephone signal is being transmitted via the broadband-communication link when a power failure at the communication device is detected by the detector;
   the call transfer device is further configured to send a call-transfer command from the communication device to a service provider of the first telephone number,
   the call transfer command initiates the transfer of the transmission from the broadband communication link to the alternative communication link by re-routing, the transmission of the telephone signal established between a first endpoint, located at the communication device and associated with the first telephone number, and a remote second endpoint, distant from the first endpoint, so as to replace the first endpoint with a further endpoint located at the communication device and associated with the second telephone number, and
   the ongoing transmission of the telephone signal is maintained at the remote second endpoint.

18. The communication device according to claim 17 further comprising a second transmitter configured to transmit the telephone signal via the alternative communication link.

19. A method of transmitting a telephone signal, the method comprising:
   transmitting the telephone signal between a first endpoint associated with a first telephone number and located at a communication device and a second remote endpoint distant from the first endpoint via a broadband-communication link coupled to the communication device during a normal operation mode;
   transmitting the telephone signal between a further endpoint associated with a second telephone number and located at the communication device and the second remote endpoint via an alternative communication link coupled to the communication device during a power failure mode at the communication device; and
   during the power failure mode, transferring transmission of the telephone signal from the first telephone number associated with the broadband communication link to the second telephone number associated with the alternative communication link wherein the process of transferring the transmission of the telephone signal comprises:
   sending a call-transfer command from the communication device to a service provider of the first telephone number, the call-transfer command initiating the transfer of the transmission, from the broadband-communication link to the alternative communication link, by re-routing the transmission of the telephone signal so as to replace the first endpoint with the further endpoint;
   receiving the transferred transmission on the alternative communication link, and
   maintaining the transmission at the second remote endpoint without the second remote endpoint dropping the transmission.

20. The method of claim 19 wherein the process of transferring the transmission of the telephone signal from the first telephone number to the second telephone number further comprises, before sending the call-transfer command, warning a user of the communication device that the transmission will be transferred.

* * * * *